United States Patent
Holmes et al.

(10) Patent No.: US 7,416,501 B2
(45) Date of Patent: Aug. 26, 2008

(54) SINGLE RANGE ELECTRICALLY VARIABLE TRANSMISSION WITH LOCKUP CLUTCH AND METHOD OF OPERATION

(75) Inventors: Alan G. Holmes, Clarkston, MI (US); Michael R. Schmidt, Carmel, IN (US); Donald Klemen, Carmel, IN (US); Larry T. Nitz, South Lyon, MI (US)

(73) Assignee: General Motors Corporation, Detroit, MI (US)

( * ) Notice: Subject to any disclaimer, the term of this patent is extended or adjusted under 35 U.S.C. 154(b) by 182 days.

(21) Appl. No.: 11/317,672

(22) Filed: Dec. 22, 2005

(65) Prior Publication Data

US 2007/0149334 A1    Jun. 28, 2007

(51) Int. Cl.
*F16H 3/72* (2006.01)
(52) U.S. Cl. .......................... 475/5; 475/149; 903/910; 192/3.52
(58) Field of Classification Search ............. 475/5, 475/149; 477/5; 903/910, 911; 192/3.52
See application file for complete search history.

(56) References Cited

U.S. PATENT DOCUMENTS

| 6,146,302 | A * | 11/2000 | Kashiwase | 475/5 |
| 6,527,658 | B2 | 3/2003 | Holmes et al. | 475/5 |
| 6,953,409 | B2 | 10/2005 | Schmidt et al. | 475/5 |
| 2006/0128513 | A1 * | 6/2006 | Tata et al. | 475/5 |

OTHER PUBLICATIONS

Alan Glen Holmes, Electrically Variable Transmissions for Hybrid Vehicles, Thesis, Ohio State University, Mar. 24, 2000, pp. 58-59.

* cited by examiner

*Primary Examiner*—Sherry Estremsky
*Assistant Examiner*—Edwin A Young (57) ABSTRACT

A single range, electrically variable transmission (EVT) is provided with a lockup clutch that reduces motor power requirements. When applied, the lockup clutch allows engine torque to be transmitted directly to the output without the necessity of a motor/generator supplying reaction torque. With the lockup clutch applied, the transmission operates with zero electro-mechanical power flow at a fixed mechanical ratio, thus mitigating the power peak which occurs through the motor/generators. Input-split, output-split, and compound-split transmissions are disclosed. A method of operating an EVT with a lockup clutch is also provided.

5 Claims, 3 Drawing Sheets

SINGLE RANGE ELECTRICALLY VARIABLE TRANSMISSION WITH LOCKUP CLUTCH AND METHOD OF OPERATION

TECHNICAL FIELD

The invention relates to an electrically variable transmission with a lockup clutch.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. Such an engine is typically operated through a wide range of speeds and a wide range of loads and typically at an average of approximately a fifth of its maximum power output. A power-split hybrid transmission may be employed to make more efficient use of an internal combustion engine in a vehicle by allowing the engine to operate closer to its peak in efficiency or its peak in power, by virtue of continuously variable gear ratio and the assistance of an energy storage device such as a battery.

A power-split hybrid transmission can use what is commonly understood to be a "differential gear set" to achieve a continuously variable torque and speed ratio between input and output. An electrically variable transmission can use a differential gear set to send a fraction of its transmitted power through a pair of electric motor/generators. The remainder of its power flows through another, parallel path that is all mechanical and direct, of fixed ratio, or alternatively selectable.

One form of a differential gear set, as is well known to those skilled in this art, may constitute a planetary gear set. Planetary gearing is usually the preferred embodiment employed in differentially geared inventions, with the advantages of compactness and different torque and speed ratios among all members of the planetary gear set. However, other types of differential gear sets may be used, such as bevel gears other gears in an arrangement where the rotational speed of at least one element of a gear set is always a weighted average of speeds of two other elements.

A two-range, compound-split, hybrid electro-mechanical transmission having four fixed ratios is disclosed in U.S. Pat. No. 6,953,409, commonly assigned with the present application, and hereby incorporated by reference in its entirety. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators. The transmission may be operated both in an input-split mode and a compound-split mode. Several clutches of substantial capacity are required, including multiple clutches effecting alternative power flows from a differential gear set to the output of the transmission.

"Input-split" means that one member of a differential gear set is connected to the input member and receives all of the power flowing into the transmission, so that differential gear set can split that power into an electro-mechanical power path including a pair of motor-generators, and a mechanical power path through the transmission. "Output-split" means that one member of a differential gear set is connected to the output member and receives all of the power flowing out of the transmission to the output member, so that differential gear set can combine power from an electro-mechanical power path and a mechanical power path through the transmission. "Compound-split" means that these characteristics of input-split and output-split are both present in the transmission at the same time.

Operation in first or second variable-speed-ratio modes of operation may be selectively achieved by using clutches in the nature of first and second torque transfer devices. In the first mode, an input-split speed ratio range is formed by the application of the first clutch, and the output speed of the transmission is proportional to the speed of one motor/generator. In the second mode, a compound-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation at fixed transmission speed ratio may be selectively achieved by the application of one of the first and second clutches, along with application of either of a third or fourth torque transfer device. The transmission incorporates one mechanical point in its first mode of operation and two mechanical points in its second mode of operation. As used herein, a "mechanical point" is a finite, non-zero speed ratio between the transmission input member and the transmission output member, where the speed of one of the motor/generators is zero. Thus, a mechanical point occurs when either motor/generator is stationary at any time during operation of the transmission.

U.S. Pat. No. 6,527,658, issued Mar. 4, 2003 to Holmes et al, commonly assigned with the present application, and hereby incorporated by reference in its entirety, discloses an electrically variable transmission utilizing two planetary gear sets, two motor/generators and two clutches to provide input-split, compound-split, neutral and reverse modes of operation. Both planetary gear sets may be simple, or one may be individually compounded. A control unit regulates power flow among an energy storage device and the two motor/generators. This transmission provides two ranges or modes of electrically variable transmission (EVT) operation, selectively providing an input-split speed ratio range and a compound-split speed ratio range. One fixed speed ratio can also be selectively achieved, but only by the simultaneous use of multiple clutches.

A single range, input-split system requires a high portion of the engine power to flow through the electro-mechanical path during acceleration, thus increasing motor power requirements and potentially requiring a DC-DC converter between a storage battery and the motor/generators in order to provide enough voltage. Power flow through the transmission would be entirely through the electro-mechanical path with the output member at rest, but the power transmitted with the output member at rest is actually zero. As the vehicle accelerates from rest, the amount of power transmitted through the electro-mechanical path builds up to a relatively high value, then drops to zero as the transmission ratio reaches the mechanical point of the input-split mode of operation. If the vehicle operates at a ratio beyond the mechanical point, such as a low engine speed and high vehicle speed for cruising, the power transmitted through the electro-mechanical path is negative, from the output member toward the input member, that is, counter to the overall flow of power through the transmission, and rises sharply as the ratio changes further from the mechanical point. Additionally, the output motor in an input-split design must also have a high torque rating; typically, one to two times the engine torque, depending on the gear ratio available. The situation with a single range, compound-split transmission is similar, except that the electro-mechanical power flow at low output speeds, below the lower of the two mechanical points, is counter to the overall power flow through the transmission and rises rapidly with falling output speed.

A two range, input-split and compound-split system generally achieves a wide ratio of coverage, but requires clutches for transitions from range to range, with associated spin losses and accessory power requirements to operate those clutches.

Most EVTs constructed to date have a single operating range: that is, a single arrangement of gearing wherein all of the mechanical power must be transmitted through the mechanical path of the transmission at only one ratio (in the cases of input-split or output-split) or two ratios (in the case of compound-split) of input speed to output speed. Moreover, EVT operation may result in a flow of power through the electro-mechanical path that opposed the flow of mechanical power through the mechanical power path at all speed ratios beyond the pure mechanical ratio, that is, the mechanical point. Thus, to cover a wide range of speed ratios from input to output, the single-range EVT must have a mechanical point near the extreme ratio that will be used continuously, such as vehicle cruising, and thus must be able to transmit a large fraction of the total power through the transmission by means of the electric motor/generators during acceleration, necessitating motor/generators with high torque ratings and thus relatively high cost.

SUMMARY OF THE INVENTION

A single range, electrically variable transmission (EVT) is provided with a lockup clutch that reduces motor power requirements. When applied, the lockup clutch allows engine torque to be transmitted directly to the output member without the necessity of the first motor/generator supplying reaction torque. With the lockup clutch applied, the transmission operates with zero power flow through the electro-mechanical power path at the direct drive ratio, thus mitigating the power peak (i.e., motor power requirement) which typically occurs around the mechanical ratio of 1:1 through the differential gearing.

Specifically, the electrically variable transmission includes an input member for receiving power from an engine and an output member for delivering power from the transmission. First and second motor/generators are operatively connected between the input member and the output member and are controllable to provide or receive power flowing therebetween. A differential gear set having a first, a second and a third member is operatively connected between the input member and the output member. One of the members of the differential gear set is continuously connected with either the input member or the output member. Another of the members of the differential gear set is continuously connected with one of the motor/generators. A lockup clutch is selectively engagable to connect any two of the members of the differential gear set together for common rotation. A compound differential gear set with four operative members configured to rotate at four individual speeds may be employed to establish a compound-split power flow arrangement.

Thus, engagement of the lockup clutch provides a fixed mechanical speed ratio between the input member and the output member without requiring power from either of the motor/generators. This allows smaller, less expensive motor/generators to be employed. A "fixed speed ratio" is an operating condition in which the mechanical power input to the transmission is transmitted mechanically to the output member, and no power flow is necessary in the motor/generators. An electrically variable transmission that may selectively achieve fixed speed ratios for operation near full engine power can be smaller and lighter for a given maximum capacity. Fixed ratio operation may also result in lower fuel consumption when operating under conditions where engine speeds can approach its optimum without using the motor/generators. When the lock-up clutch is engaged so that the transmission operates to provide a fixed speed ratio, electro-mechanical power need not be circulated through either the first or the second motor/generator to provide rotation at the output member. However, if desired, electrical power may be utilized in the motor/generators, as more fully described below, to supplement engine power. A variety of fixed speed ratios and variable ratio spreads can be realized by suitably selecting the tooth ratios of the differential gear set or gear members in a transmission.

The motor/generators and the first differential gear set establish a single range power flow arrangement when the lockup clutch is not engaged. As used herein, a "single range" or "one range" means that only one particular connecting scheme results in operation in a continuously variable range of speed ratios with the speed ratio being dependent on the speed of the input member and the speed of at least one of the motor/generators.

The electrically variable transmission may be an input-split type, an output-split type or a compound-split type. If the transmission is a compound-split type, a compound differential gear set having four operative members configured to rotate at four individual speeds may be employed. This may be accomplished by a second differential gear set connected between the input member and the output member. Regardless of which of these types is utilized, no extra torque-transmitting mechanisms (i.e., rotating clutches or brakes) are necessary to establish the fixed speed ratio.

A method of operating the electrically variable transmission includes engaging the lockup clutch to connect two members of the differential gear set together, thereby providing a fixed mechanical ratio between the input member and the output member of the transmission. Power flow to or from the motor/generators is not required to establish the fixed mechanical ratio. Under the method, at least one of the motor/generators may be controlled to act as a motor, assisting the engine by adding torque to the output member during engagement of the lockup clutch.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

First Embodiment—Input-Split Type EVT

Figure 1:
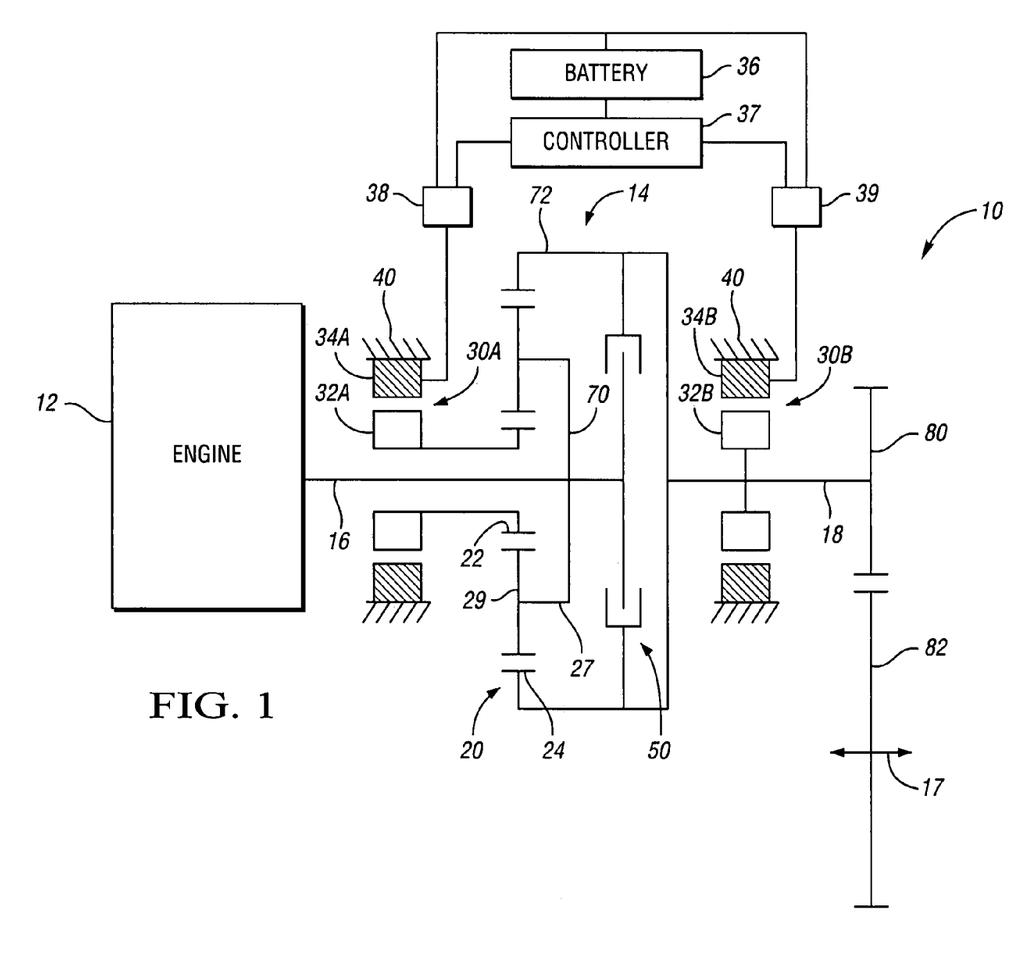
FIG. 1 is a schematic illustration of an input-split, electrically variable transmission within the scope of the invention.

Referring to the drawings, wherein like reference numbers refer to like components, one representative form of a single-range, input-split EVT embodying the concepts of the present invention is depicted in the powertrain 10 of FIG. 1. The power train 10 includes an engine 12 and an electrically variable transmission 14. The engine 12 drives an input member 16 of the transmission 14. The input member 16 may be in the nature of a shaft which may be directly driven by the engine 12. The engine 12 may be a fossil fuel engine, such as an internal combustion engine or a diesel engine, which is readily adapted to provide its available power output delivered at a constant number of revolutions per minute (rpm). Power flows from the input member 16 through the transmission 14 as will be described below to be delivered at an output member 18 for powering a final drive 17.

The transmission 14 includes a first planetary gear set 20 that includes a sun gear member 22, a ring gear member 24 circumscribing the sun gear member 22 and a carrier member 27 that rotatably supports a plurality of pinion gears 29 that meshingly engage with both the ring gear member 24 and the sun gear member 22. The input member 16 is continuously connected with the carrier member 27 for providing power thereto.

The input member 16 and output member 18 are aligned to form an axis of rotation therethrough, running along the lines schematically depicting the input member 16 and the output member 18 in FIG. 1. First and second motor/generators 30A, 30B are concentrically disposed about the common axis of rotation formed by the input member 16 and output member 18 for rotation thereabout. As will be well understood by those skilled in the art, each of the motor/generators 30A, 30B includes a stator 34A, 34B, respectively, secured to a stationary member such as the transmission housing 40. Each motor/generator also includes a rotatable rotor 32A, 32B, respectively. The rotor 32A of the first motor/generator 30A is secured to the sun gear member 22 for common rotation therewith. The rotor 32B of the second motor/generator 30B is secured to the output member 18 for common rotation therewith.

As should be apparent from the foregoing description, the transmission 14 selectively receives power from the engine 12. The transmission 14 also receives power from an electric storage device 36 such as a battery. Other electric storage devices that have the ability to store electric power and dispense electric power may be used in place of the battery 36 without altering the concepts of the present invention. The battery 36 will be sized depending on regenerative requirements, regional issues such as grade and temperature, and other requirements such as emissions, power assist and electric range.

A controller 37 is connected in signal communication with the battery 36. The controller 37 also is in signal communication with the first motor/generator 30A and the second motor/generator 30B through power inverters 38, 39. Preferably, the controller 37 communicates with other vehicle electrical components, such as electric power steering and electrical power braking systems, etc. The controller 37 responds to a variety of input signals including vehicle speed, operator demand, the level to which the battery 36 is charged and the power being applied by the engine 12, to regulate the flow of power between the motor/generators 30A and 30B and the battery 36. The controller 37 can manipulate each motor/generator 30A and 30B to act as either a motor or a generator. The controller 37 also regulates the flow of power into and out of the battery 36. Power inverters 38, 39 are connected between motor/generators 30A, 30B, respectively and the controller to convert between direct current required by the battery 36 and alternating current required by the motor/generators 30A, 30B.

A lockup clutch 50 is provided that is selectively engagable to operatively connect the input member 16 with the output member 18 to establish a fixed direct drive ratio that does not require power flow through either of the motor/generators 30A, 30B. The lockup clutch 50 connects the carrier member 27 with the ring gear member 24 via a hub or interconnecting member 70 that also continuously connects the input member 16 with the carrier member 27. Another hub or interconnecting member 72 continuously connects the ring gear member 24 with the output member 18 (and thereby with the rotor 32B which is connected thereto). A first transfer gear 80 is connected for common rotation with the output member 18 and intermeshes with a second transfer gear 82 which is connected for common rotation with the final drive 17, providing power to vehicle wheels.

The input member 16 is continuously connected to the carrier member 27 through the interconnecting member 70, thus allowing the engine 12 to provide power to the carrier member 27 by causing it to rotate in the same direction as the input member 16. As discussed above, the ring gear member 24 is continuously connected with the output member 18 through the interconnecting member 72. The sun gear member 22 is continuously connected to the first motor/generator 30A. Thus, when the first motor/generator 30A acts as a motor, it drives the sun gear member 22. Alternatively, if the motor/generator 30A is controlled by the controller 37 to act as a generator, the rotation of the sun gear member 22 powers the first motor/generator 30A. The power and speed applied to the sun gear member 22 is thus affected by the motor or generator status of the first motor/generator 30A. In either case, power is split through the first planetary gear set 20, being provided both from the engine 12 and from the first motor/generator 30A or to the first motor/generator 30A, thereby affecting the speed and power supplied to the output member 18. Notably, the second motor/generator 30B is continuously connected with the output member 18 and may be controlled by the controller 37 to act as a motor, thereby providing power and driving the output member 18 or to act as a generator thereby being driven by rotation of the output member 18. Finally, power flows through the transfer gears 80, 82 to the final drive 17.

If the lock-up clutch 50 is engaged, the carrier member 27 is connected with the ring gear member 24, and the entire planetary gear set 20 rotates at the same speed as the input member 16. Because the output member 18 is continuously connected with the ring gear member 24, the output member 18 also rotates at the same speed as the input member 16. Thus, the speed ratio of the input member 16 to the output member 18 is fixed at direct drive ratio (1.0) and is entirely mechanical (i.e., established by power from the engine 12 without power being required from the motor/generators 30A, 30B). During application of the lock-up clutch 50, the controller 37 may control the motor/generators 30A, 30B to free wheel, or may provide power to one or both of the motor/generators 30A, 30B to cause them to act as motors, supplementing torque supplied by the engine 12 to the output member 18, but not changing the fixed, direct drive speed ratio through the transmission 14.

Second Embodiment—Output-Split Type EVT

Figure 2:
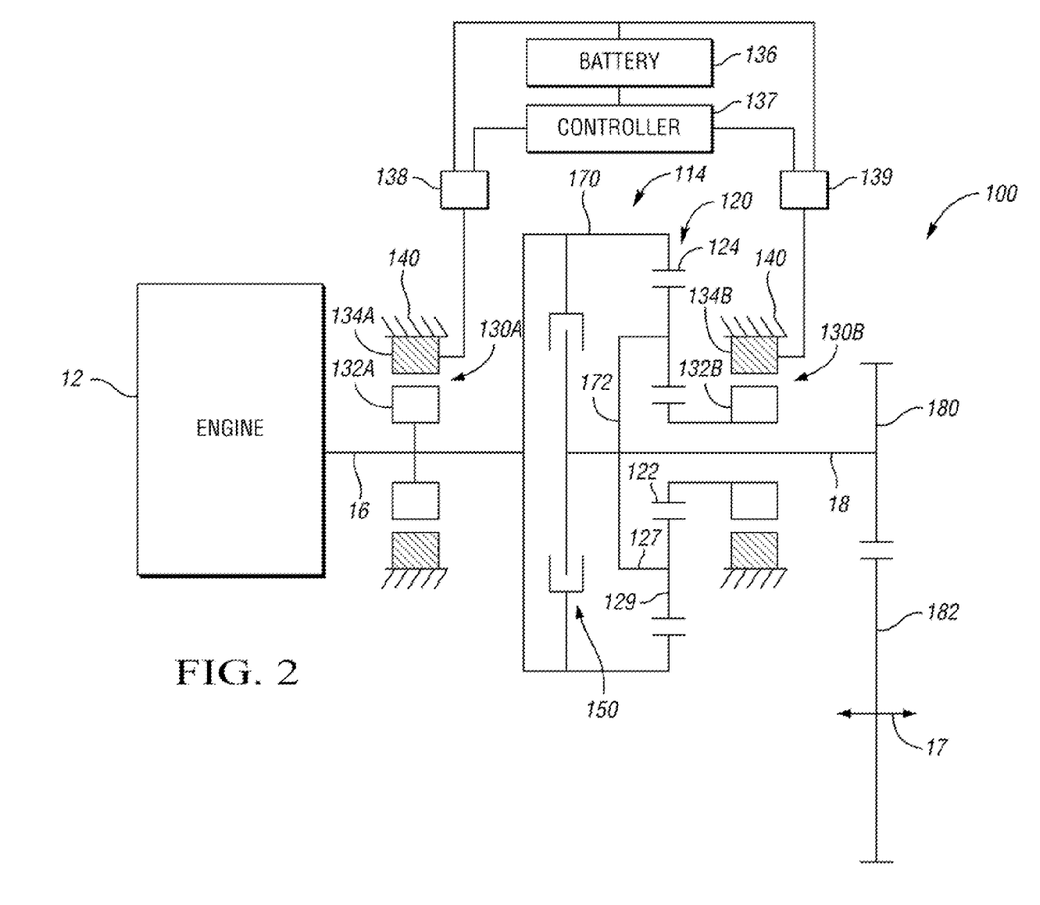
FIG. 2 is a schematic illustration of an output-split electrically variable transmission within the scope of the invention.

One representative form of a single-range, output-split EVT embodying the concepts of the present invention is depicted in the powertrain 100 of FIG. 2. The power train 100 includes an engine 12 and an electrically variable transmission 114. The engine 12 drives an input member 16 of the transmission 114. The input member 16 may be in the nature of a shaft which may be directly driven by the engine 12. Power flows from the input member 16 through the transmission 114 as will be described below to be delivered at an output member 18 for powering a final drive 17.

The transmission 14 includes a first planetary gear set 120 that includes a sun gear member 122, a ring gear member 124 circumscribing the sun gear member 122 and a carrier member 127 that rotatably supports a plurality of pinion gears 129 that meshingly engage with both the ring gear member 124 and the sun gear member 122. The input member 16 is continuously connected with the ring gear member 124 for providing power thereto.

The input member 16 and output member 18 are aligned to form an axis of rotation therethrough, running along the lines schematically depicting the input member 16 and the output member 18 in FIG. 1. First and second motor/generators 130A, 130B are concentrically disposed about the common axis of rotation formed by the input member 16 and output member 18 for rotation thereabout. As will be well understood by those skilled in the art, each of the motor/generators 130A, 130B includes a stator 134A, 134B, respectively, secured to a stationary member such as the transmission housing 140. Each motor/generator also includes a rotatable rotor 132A, 132B, respectively. The rotor 132A of the first motor/generator 130A is secured to the input member 16 for common rotation therewith. The rotor 132B of the second motor/generator 130B is secured to the sun gear member 122 for common rotation therewith.

As should be apparent from the foregoing description, the transmission 114 selectively receives power from the engine 12. The transmission 114 may also receive power from an electric storage device 136 such as a battery. Other electric storage devices that have the ability to store electric power and dispense electric power may be used in place of the battery 136 without altering the concepts of the present invention. The battery 136 will be sized depending on regenerative requirements, regional issues such as grade and temperature, and other requirements such as emissions, power assist and electric range.

A controller 137 is connected in signal communication with the battery 136. The controller 137 also is in signal communication with the first motor/generator 130A and the second motor/generator 130B through power inverters 138, 139. Preferably, the controller 137 communicates with other vehicle electrical components, such as electric power steering and electrical power braking systems, etc. The controller 137 responds to a variety of input signals including vehicle speed, operator demand, the level to which the battery 136 is charged and the power being applied by the engine 12, to regulate the flow of power between the motor/generators 130A and 130B and the battery 136. The controller 137 can manipulate each motor/generator 130A and 130B to act as either a motor or a generator. The controller 137 also regulates the flow of power into and out of the battery 136. Power inverters 138, 139 are connected between motor/generators 130A, 130B, respectively and the controller 137 to convert between direct current required by the battery 136 and alternating current required by the motor/generators 130A, 130B.

A lockup clutch 150 is provided that is selectively engagable to operatively connect the input member 16 with the output member 18 to establish a fixed direct drive ratio that does not require power flow through either of the motor/generators 130A, 130B. The lockup clutch 150 connects the carrier member 127 with the ring gear member 124 via hubs or interconnecting members 170, 172. Interconnecting member 170 continuously connects the ring gear member 124 with the input member 16 (and thereby with the rotor 130A which is continuously connected to the input member 16). Interconnecting member 172 continuously connects the carrier member 127 with the output member 18. A first transfer gear 180 is connected for common rotation with the output member 18 and intermeshes with a second transfer gear 182 which is connected for common rotation with the final drive 17.

The input member 16 is continuously connected to the ring gear member 124 through the interconnecting member 170, thus allowing the engine 12 to provide power to the ring gear member 124 by causing it to rotate in the same direction as the input member 16. As discussed above, the carrier member 127 is continuously connected with the output member 18 through the interconnecting member 172. The sun gear member 122 is continuously connected to the second motor/generator 130B. Thus, when the second motor/generator 130B acts as a motor, it drives the sun gear member 122. Alternatively, if the motor/generator 130A is controlled by the controller 137 to act as a generator, the rotation of the sun gear member 122 powers the second motor/generator 130B. The power and speed applied to the sun gear member 122 is thus affected by the motor or generator status of the second motor/generator 130B. In either case, power is split through the planetary gear set 120, being provided both from the engine 12 and from the second motor/generator 130B (or to the second motor/generator 130B), thereby affecting the speed and power supplied to the output member 18. Notably, the first motor/generator 30A is continuously connected with the input member 16 and may be controlled by the controller 37 to act as a motor, thereby providing power to drive the input member 16 or to act as a generator, thereby being driven by rotation of the input member 16. Finally, power flows through the transfer gears 180, 182 to the final drive 17.

If the lock-up clutch 150 is engaged, the carrier member 127 is connected with the ring gear member 124, and the entire planetary gear set 120 rotates at the same speed as the output member 18. Because the input member 16 is continuously connected with the ring gear member 124, the entire planetary gear set thus also rotates at the same speed as the input member 16. Thus, the speed ratio of the input member 16 to the output member 18 is fixed at direct drive ratio (1.0) and is entirely mechanical. During application of the lock-up clutch 150, the controller 137 may control the motor/generators 130A, 130B to free wheel, or optionally to provide power to one or both of the motor/generators 130A, 130B to cause them to act as motors, supplementing torque supplied by the engine 12 to the output member 18, but not changing the speed ratio through the transmission 114.

Third Embodiment: Compound-Split Type EVT

Figure 3:
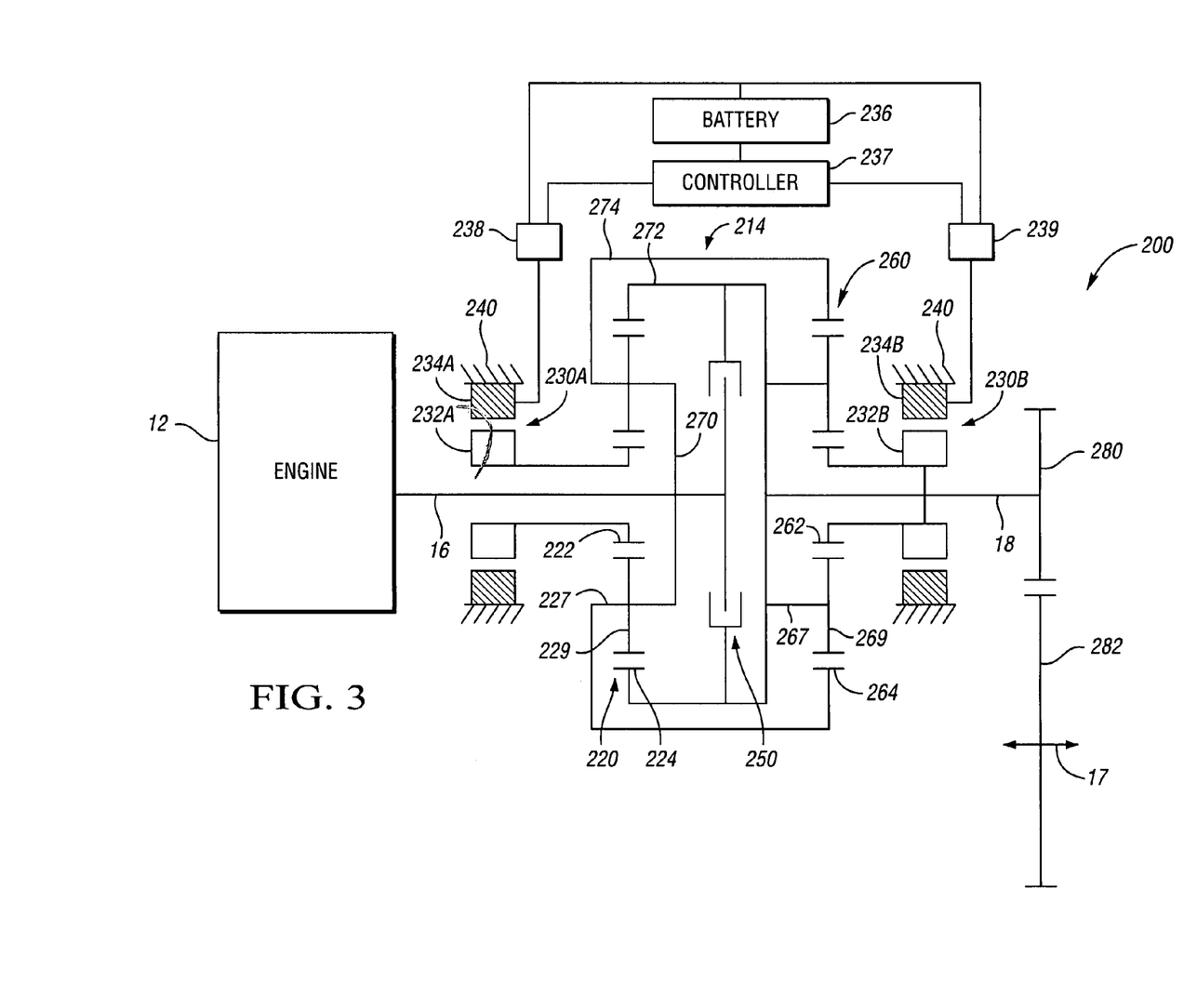
FIG. 3 is a schematic illustration of a compound split, electrically variable transmission within the scope of the invention.

One representative form of a single-range, compound-split EVT embodying the concepts of the present invention is depicted in the powertrain 200 of FIG. 3. The power train 200 includes an engine 12 and an electrically variable transmission 214. The engine 12 drives an input member 16 of the transmission 214. The input member 16 may be in the nature of a shaft which may be directly driven by the engine 12. Power flows from the input member 16 through the transmission 214 as will be described below to be delivered at an output member 18 for powering a final drive 17.

The transmission 214 includes a first planetary gear set 220 that includes a sun gear member 222, a ring gear member 224 circumscribing the sun gear member 222 and a carrier member 227 that rotatably supports a plurality of pinion gears 229 that meshingly engage with both the ring gear member 224 and the sun gear member 222. The input member 16 is continuously connected with the carrier member 227 for providing power thereto.

The transmission 214 further includes a second planetary gear set 260 that includes a sun gear member 262, a ring gear member 264 circumscribing the sun gear member 262 and a carrier member 267 that rotatably supports a plurality of pinion gears 269 that meshingly engage with both the ring gear member 264 and the sun gear member 262. The output member 18 is continuously connected with the carrier member 267 for providing power thereto (e.g., during regenerative braking) or for receiving power therefrom.

As will be understood by those skilled in the art, the first planetary gear set 220 and the second planetary gear set 260 may be interconnected to form a compound differential gear set 220, 260. In the combination of gear sets 220, 260 demonstrated herein, the operative members of the compound differential gear set are configured for rotation with four individual speeds, so that they may be operatively connected to an input member 216, an output member 218, and first and second motor/generators, 230A, 230B, which rotate at four individual speeds. In the transmission 214, the carrier member 227 is the first operative member, the sun gear member 222 is the second operative member, the sun gear member 262 is the third operative member and the carrier member 267 is the fourth operative member. Two of said four speeds may be determined independently and the other two of said four speeds are mathematically linear combinations of the said two speeds which may be independently determined. As will also be understood by those skilled in the art, a compound differential gear set may be constructed in very many different arrangements, including many different types of planetary gear sets, each of which arrangements are also configured for rotation with this same operative capacity for attaching four such members with four individual speeds, wherein two of said members rotate with speeds which are dependent upon the speeds of the other two of said members.

The input member 16 and output member 18 are aligned to form an axis of rotation therethrough, running along the lines schematically depicting the input member 16 and the output member 18 in FIG. 1. First and second motor/generators 230A, 230B are concentrically disposed about the common axis of rotation formed by the input member 17 and output member 18 for rotation thereabout. As will be well understood by those skilled in the art, each of the motor/generators 230A, 230B includes a stator 234A, 234B, respectively, secured to a stationary member such as the transmission housing 240. Each motor/generator also includes a rotatable rotor 232A, 232B, respectively. The rotor 232A of the first motor/generator 230A is secured to the sun gear member 222 for common rotation therewith. The rotor 232B of the second motor/generator 230B is secured to the sun gear member 262 for common rotation therewith.

As should be apparent from the foregoing description, the transmission 214 selectively receives power from the engine 12. The transmission 214 also receives power from an electric storage device 236 such as a battery. Other electric storage devices that have the ability to store electric power and dispense electric power may be used in place of the battery 236 without altering the concepts of the present invention. The battery 236 will be sized depending on regenerative requirements, regional issues such as grade and temperature, and other requirements such as emissions, power assist and electric range.

A controller 237 is connected in signal communication with the battery 236. The controller 237 also is in signal communication with the first motor/generator 230A and the second motor/generator 230B through power inverters 238, 239. Preferably, the controller 237 communicates with other vehicle electrical components, such as electric power steering and electrical power braking systems, etc. The controller 237 responds to a variety of input signals including vehicle speed, operator demand, the level to which the battery 236 is charged and the power being applied by the engine 12, to regulate the flow of power between the motor/generators 230A and 230B and the battery 236. The controller 237 can manipulate each motor/generator 230A and 230B to act as either a motor or a generator. The controller 237 also regulates the flow of power into and out of the battery 236. Power inverters 238, 239 are connected between motor/generators 230A, 230B, respectively and the controller 237 to convert between direct current required by the battery 236 and alternating current required by the motor/generators 230A, 230B.

A lockup clutch 250 is provided that is selectively engagable to operatively connect the input member 16 with the output member 18 to establish a fixed direct drive ratio that does not require power flow through either of the motor/generators 230A, 230B. The lockup clutch 250 connects the carrier member 227 with the ring gear member 224 via hubs or interconnecting members 270, 272. Interconnecting member 270 continuously connects the carrier member 227 with the input member 16. Interconnecting member 272 continuously connects the ring gear member 224 with the output member 18 and also with the carrier member 267. Interconnecting member 274 connects the carrier member 227 with the ring gear member 264. A first transfer gear 280 is connected for common rotation with the output member 18 and intermeshes with a second transfer gear 282 which is connected for common rotation with the final drive 17.

The input member 16 is continuously connected to the carrier member 227 through the interconnecting member 270, thus allowing the engine 12 to provide power to the carrier member 227 by causing it to rotate in the same direction as the input member 16. The sun gear member 222 is continuously connected to the first motor/generator 230A. Thus, when the first motor/generator 230A acts as a motor, it drives the sun gear member 222. Alternatively, if the motor/generator 230A is controlled by the controller 237 to act as a generator, the rotation of the sun gear member 222 powers the first motor/generator 230A. The power and speed applied to the sun gear member 222 is thus affected by the motor or generator status of the first motor/generator 230A. In either case, power is split through the planetary gear set 220, being provided both from the engine 12 and from the first motor/generator 130A (or to the first motor/generator 130A), thereby affecting the speed and power supplied through the interconnecting members 270, 272 to the ring gear member 264 and carrier member 267, respectively. The input member 16 is continuously connected with the ring gear member 264 via the interconnecting members 270 and 274. The carrier member 267 is continuously connected with the output member 18 through the interconnecting member 272. The sun gear member 262 is continuously connected to the second motor/generator 230B. Thus, when the second motor/generator 230B is controlled by controller 37 to act as a motor, it drives the sun gear member 262. Alternatively, if the second motor/generator 230B is controlled by the controller 237 to act as a generator, the rotation of the sun gear member 262 powers the second motor/generator 230B. The power and speed applied to the sun gear member 262 is thus affected by the motor or generator status of the second motor/generator 230B. In either case, power is split through the planetary gear set 260, being provided both from the engine 12 and from the second motor/generator 230B (or to the second motor/generator 230B), thereby affecting the speed and power supplied to the output member 18. Finally, power flows through the transfer gears 280, 282 to the final drive 17.

If the lock-up clutch 250 is engaged, the carrier member 227 is connected with the ring gear member 224, and the ring gear member 264 is connected with the carrier member 267. Thus, the input member 16, the entire planetary gear set 220, the entire planetary gear set 260 and the output member 18 rotate at the same speed. Thus, the speed ratio of the input member 16 to the output member 18 is fixed at direct drive (1.0) and is entirely mechanical. During application of the lock-up clutch 250, the controller 237 may control the motor/generators 230A, 230B to free wheel, or may provide power to one or both of the motor/generators 230A, 230B to cause them to act as motors, supplementing torque supplied by the engine 12 to the output member 18, but not changing the speed ratio through the transmission 214.

In compound-split transmission 214, the two planetary gear sets 220, 260 isolate the motor/generators 230A, 230B from the input member 16, and the output member 18, such that there are four distinct speeds: input member 16, output member 18, first motor/generator 230A and second motor/generator 230B. Thus, the transmission 214 has two finite, non-zero speed ratios where the speed of one of the motor/generators is zero (i.e., two mechanical points). As those skilled in the art will understand, a mechanical point occurs when either of the motor/generators 230A, 230B is stationary at any time during operation of the transmission 214. Thus, one mechanical point occurs when the first motor/generator 230A has zero speed while the input member 16 and the second motor/generator 260A have different non-zero speeds. The other mechanical point occurs when the second motor/generator 260A has zero speed while the input member 16 and the first motor/generator 230A have different non-zero speeds. Maximum efficiency in the transfer of power from the engine 12 to the output member 18 occurs when one of the motor/generators 230A, 230B is at a mechanical point, because the power transferred through the relatively inefficient electro-mechanical power path is zero. Preferably, the tooth ratios of the differential gear sets 220, 260 are selected to establish a wide spread between the ratio established at each respective mechanical point. Thus if the lockup clutch 250 is controlled to engage approximately halfway between the two mechanical points, the power peak inherent in operating half-way between two mechanical points is avoided.

It should be appreciated that the transmissions 14, 114 and 214 discussed above operate with zero electro-mechanical power flow when the respective lockup clutch 50, 150, 250 is applied. That is, it is not necessary to add power from the motor/generators 30A, 130A, 230A at the direct drive ratio.

A method of controlling an EVT applies to all of the transmissions 14, 114, 214, described above and will be discussed with respect to the transmission 14. The method includes engaging a lockup clutch 50 to connect two members (ring gear member 24 and carrier member 27) of a differential gear set 20 for common rotation. Engaging the lockup clutch provides a fixed mechanical ratio (a direct ratio) between the input member 16 and the output member 18 of the transmission 14. Power flow from the motor/generators 30A, 30B is not required to establish the fixed mechanical ratio. Moreover, the motor/generators 30A, 30B and differential gear set 20 establish a single range power flow arrangement when the lockup clutch is not engaged. Preferably, the method includes controlling one of the motor/generators 30A to act as a motor to supply torque when the lockup clutch 50 is engaged, without changing the speed ratio.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission comprising:
   an input member for receiving power from an engine;
   an output member for delivering power from the transmission;
   first and second motor/generators each operatively connected between said input member and said output member and controllable to provide or receive power flowing therebetween;
   a first differential gear set operatively connected between said input member and said output member and having a first, a second and a third member; wherein one of said members of said first differential gear set is continuously connected with one of said input member and said output member and another of said members of said first differential gear set is continuously connected with one of said motor/generators;
   a lockup clutch selectively engagable to connect any two of said members of said first differential gear set together for common rotation, engagement of said lockup clutch thereby providing a fixed mechanical ratio between said input member and said output member without requiring power from either of said motor/generators; and wherein said motor/generators and said first differential gear set establish a single range power flow arrangement when said lockup clutch is not engaged;
   wherein said transmission is an input-split type; wherein said first differential gear set is a planetary gear set and said members of said first differential gear set are a ring gear member, a carrier member and a sun gear member;
   wherein said input member is continuously connected with said carrier member; wherein said first motor/generator is continuously connected with said sun gear member; and wherein said ring gear member is continuously connected with said second motor/generator and said output member.

2. The electrically variable transmission of claim 1, wherein said transmission is characterized by an absence of any additional selectable torque-transmitting mechanism capable of receiving all of the power flow through the transmission and acting on any of said first differential gear set, said first motor/generator and said second motor/generator.

3. The electrically variable transmission of claim 1, wherein said transmission is characterized by an absence of any additional selectable torque-transmitting mechanism acting on any of said first differential gear set, said first motor/generator and said second motor/generator.

4. An electrically variable transmission comprising:
   an input member for receiving power from an engine;
   an output member for delivering power from the transmission;
   first and second motor/generators each operatively connected between said input member and said output member and controllable to provide or receive power flowing therebetween;

a compound differential gear set operatively connected between said input member and said output member and having first, second, third and fourth operative members; wherein said input member is connected with said first operative member of said compound differential gear set; wherein one of said motor/generators is connected with said second operative member of said compound differential gear set; wherein the other of said motor/generators is connected with said third operative member of said compound differential gear set; wherein said output member is connected with said fourth operative member of said compound differential gear set;

a lockup clutch selectively engagable to connect any two operative members of said compound differential gear set together for common rotation, engagement of said lockup clutch thereby providing a fixed mechanical ratio between said input member and said output member without requiring power from either of said motor/generators; wherein said motor/generators and said compound differential gear set establish a single range, compound-split, electro-mechanical power flow arrangement when said lockup clutch is not engaged; and wherein said transmission is characterized by an absence of any additional selectable torque-transmitting mechanisms acting on any of said compound differential gear set, said first motor/generator and said second motor/generator.

5. The electrically variable transmission of claim 4, wherein said transmission is characterized by an absence of any additional selectable torque-transmitting mechanism capable of receiving all of the power flowing through the transmission and acting on any of said compound differential gear set, said first motor/generator and said second motor/generator.

* * * * *